(12) United States Patent
Kanzaka et al.

(10) Patent No.: US 7,700,177 B2
(45) Date of Patent: Apr. 20, 2010

(54) RESIN MOLDED COMPONENT

(75) Inventors: Ryuji Kanzaka, Nishikamo-gun (JP); Hironori Tanikawa, Obu (JP)

(73) Assignees: Toyota Jidosha Kabushiki Kaisha, Toyota-shi (JP); Aisan Kogyo Kabushiki Kaisha, Obu-shi (JP)

( * ) Notice: Subject to any disclaimer, the term of this patent is extended or adjusted under 35 U.S.C. 154(b) by 625 days.

(21) Appl. No.: 11/295,652

(22) Filed: Dec. 7, 2005

(65) Prior Publication Data

US 2006/0134376 A1    Jun. 22, 2006

(30) Foreign Application Priority Data

Dec. 20, 2004    (JP) .............. 2004-368398

(51) Int. Cl.
B32B 3/24    (2006.01)
(52) U.S. Cl. ..................... 428/131; 428/156
(58) Field of Classification Search ........... 428/131, 428/156
See application file for complete search history.

(56) References Cited

U.S. PATENT DOCUMENTS 4,980,115 A  * 12/1990  Hatakeyama et al. ..... 264/328.7
5,341,772 A     8/1994  Döhring et al.
5,507,256 A  *  4/1996  Czadzeck .............. 123/184.53
6,199,530 B1 *  3/2001  Brassell et al. ......... 123/184.34

FOREIGN PATENT DOCUMENTS

JP    B2-2643774    3/1994

* cited by examiner

Primary Examiner—William P Watkins, III
(74) Attorney, Agent, or Firm—Kenyon & Kenyon LLP

(57) ABSTRACT

A resin molded component includes a flange having a through-hole. A concave portion is formed on the surface of the flange that faces the component on which the flange is fitted. Flows of a molten resin material meet each other at a meeting portion in a region around the through-hole during a molding process, and a weld line is formed at the meeting portion. The concave portion is formed upstream of the meeting portion at which the flows of the molten resin material meet each other, and in the vicinity of the through-hole. The thickness of the resin material in the bottom portion of the concave portion is greater than the thickness of the resin material in the thinnest portion of the wall of the concave portion.

14 Claims, 6 Drawing Sheets

RESIN MOLDED COMPONENT

INCORPORATION BY REFERENCE

The disclosure of Japanese Patent Application No. 2004-368398 filed on Dec. 20, 2004 including the specification, drawings and abstract is incorporated herein by reference in its entirety.

BACKGROUND OF THE INVENTION

1. Field of the Invention

The invention relates to a resin-molded component that includes a flange having a through-hole.

2. Description of the Related Art

Figure 9:
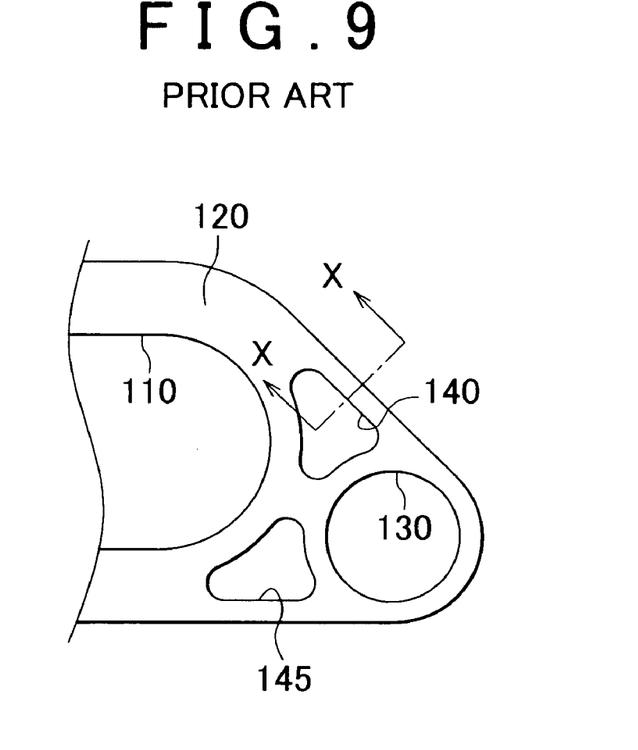
FIG. 9 is a partial frontal view showing a structure of a flange of a conventional resin intake manifold.

Japanese Patent No. 2643774 discloses a resin intake manifold for an internal combustion engine, in which concave portions may be formed in the flanges of the intake manifold by reducing the thickness of a resin material, in order to reduce the weight of the intake manifold. FIG. 9 is a schematic diagram showing part of the intake manifold disclosed in Japanese Patent No. 2643774. As shown in FIG. 9, in the intake manifold, an intake passage 110 is provided, and a through-hole 130 is formed in the flange 120.

Figure 10:
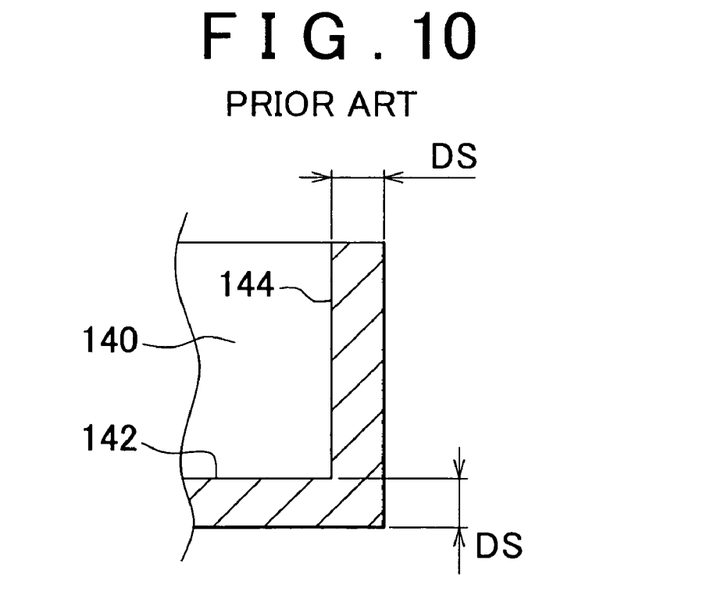
FIG. 10 is a sectional view taken along line X-X in FIG. 9.

Concave portions 140 and 145 are formed on the surface of the flange 120, the surface facing a cylinder head (not shown) when the flange 120 is fitted to the cylinder head. Each of the concave portions 140 and 145 is formed between the intake passage 110 and the through-hole 130 by reducing the thickness of the resin material. FIG. 10 is a sectional view taken along line X-X in FIG. 9. As shown in FIG. 10, the resin material in the bottom portion 142 of the concave portion 140 and the resin material in a wall 144 of the concave portion 140 are of the same thickness DS.

With this structure, it is possible to reduce the weight of the intake manifold by reducing the thickness of the resin material at portions that do not need to be thick, while maintaining rigidity of the intake manifold.

Figure 11:
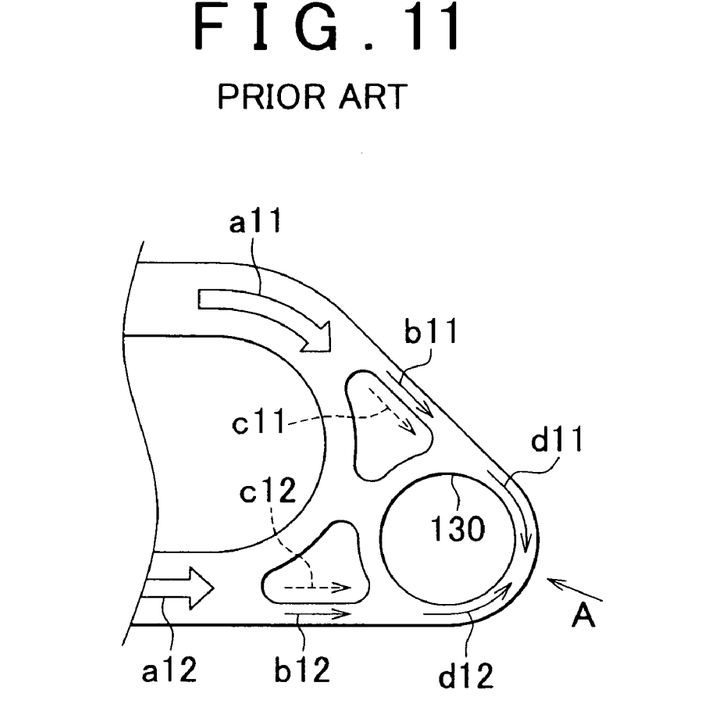
FIG. 11 is a partial frontal view showing flows of the molten resin material during a molding process of the conventional intake manifold.

To mold a resin component, a pressurized molten resin material is injected into a die. The arrows in FIG. 11 show the direction of flow of the molten resin material during the molding of the intake manifold. A thicker arrow indicates the flow of a greater quantity of the molten resin material.

As shown in FIG. 11, the resin material in each of portions corresponding to the locations indicated by arrows a11 and a12 would be thicker relative to the other portions of the flange after molding is completed. That is, a sectional area of the flowing molten resin material is large in each of the portions indicated by the arrows a11 and a12. Therefore, a flow amount of the molten resin material is relatively large in each of the portions indicated by the arrows a11 and a12.

In contrast, the resin material in each of portions corresponding to the locations indicated by arrows b11 and b12 would be thinner relative to the portions of the flange after molding is completed. That is, a sectional area of the flowing molten resin material is small in each of the portions indicated by the arrows b11 and b12. Therefore, the flow amount of the molten resin material is relatively small in each of the portions indicated by the arrows b11 and b12. Also, as shown in FIG. 10, the resin material in the bottom portion 142 of the concave portion 140 and the resin material in the wall 144 of the concave portion 140 both have the same thickness DS. Therefore, the flow amount of the molten resin material is relatively small in each of the bottom portions of the concave portions 140 and 145 indicated by arrows c11 and c12 in FIG. 11.

As shown in FIG. 11, the flow of the molten resin material follows the paths indicated by arrows d11 and d12 and passes along the periphery of the through-hole 130 until the paths meet each other. The resin material in each of the portions indicated by arrows d11 and d12 have are relatively thin after molding is completed. Therefore, the flow amount of the molten resin material is relatively small in each of the portions indicated by the arrows d11 and d12.

Figure 12:
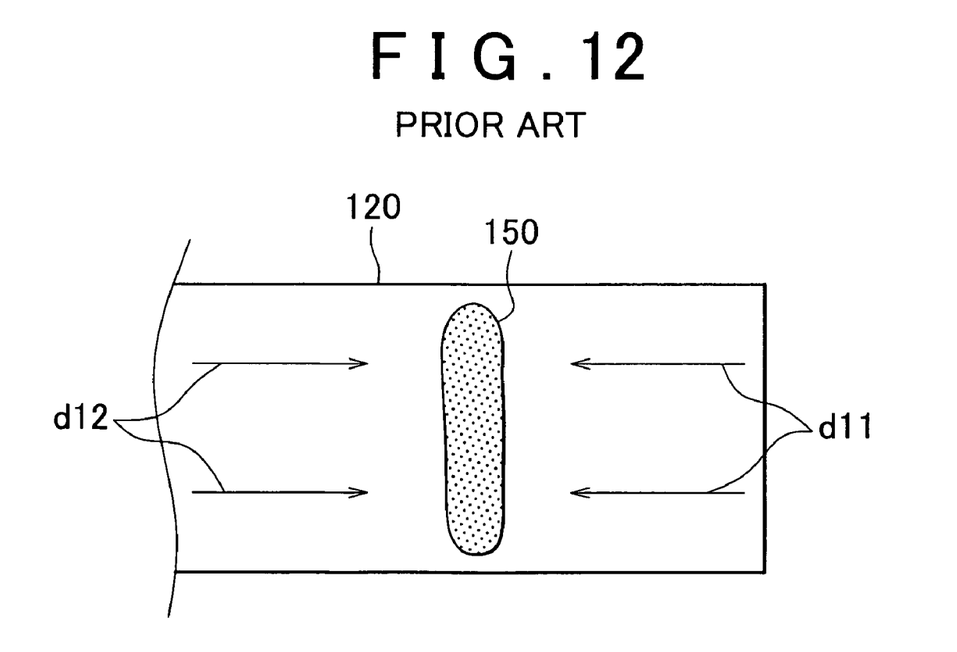
FIG. 12 is a partial lateral view showing flows of the molten resin material during the molding process of the conventional intake manifold, and a weld line.

FIG. 12 shows the view from the perspective indicated by the arrow A, in FIG. 11, of the portion of the flange at which the flows of molten resin material along the periphery of the through-hole meet. A weld line 150 is formed at the portion of the flange at which the flows of the molten resin material along the periphery of the through-hole meet. After the resin material has hardened, the rigidity of the resin material along the weld line tends to be reduced, as compared to other portions. Further, since the flow amount of the molten resin material is relatively small in each of the portions indicated by the arrows d11 and d12, this tendency becomes still more evident.

SUMMARY OF THE INVENTION

In view of the above, it is an object of the invention to provide a resin molded component that includes a flange with a through-hole that has reduced weight and high rigidity.

In order to achieve the aforementioned object, a first aspect of the invention relates to a resin molded component having a flange with a through-hole. In the resin molded component, a concave portion is formed on a surface of the flange, that faces the component on which the flange is fitted. The concave portion of the flange should be positioned in the molded resin component upstream from where the flows of molten resin material meet during the formation of the resin molded component. Generally, the weld line is formed in the periphery of the through-hole at the position where the flows of molten resin meet. In particular, the thickness of the resin material in the bottom portion of the concave portion is greater than a thickness of the resin material in the thinnest portion of the wall of the concave portion.

In the aforementioned configuration, the concave portion is formed on the surface of the flange that faces the component on which the flange will be fitted. The concave portion is positioned upstream of the location of the weld line. Setting the thickness of the resin material in the bottom portion of the concave portion to be greater than the thickness of the resin material in the thinnest portion of the wall of the concave portion, a greater amount of molten resin material can flow along the bottom portion of the concave portion than in the wall of the concave portion during the molding process. Thus, a greater amount of molten resin material flows from the bottom portion of the concave portion into the portion along the periphery of the through hole where the resin flows meet than the amount of molten resin material flowing from the wall of the concave portion into the meeting portion. As a result, the formation of the weld line can be eliminated or reduced. Therefore, it is possible to increase the rigidity of the resin-molded component, while also reducing the weight of the resin-molded component as much as possible.

In the case where the flows of the molten resin material meet each other at the meeting portion in the periphery of the through-hole formed in an end portion in a longitudinal direction of the flange, the molten resin flows for the longest possible distance until reaching the meeting portion at which the flows of the molten resin material meet each other. This configuration makes it difficult for the molten resin material to flow into the meeting portion. As a result, the rigidity is likely to be decreased at the weld line.

However, even when employing the configuration in which the through-hole is formed in the end portion in the longitudinal direction of the flange, it is possible to obtain the same effects as those obtained according to the first aspect of the invention. That is, it is possible to appropriately suppress a decrease in the rigidity of the resin molded component even when employing the configuration in which the rigidity is likely to be decreased.

In the case where a relatively small angle is formed between the directions of the two flows of the molten resin material when the two flows enter the periphery of the through-hole, the direction of each of the flows is sharply changed in the periphery of the through-hole, and then the flows meet each other. This configuration makes it difficult for the molten resin material to flow into the meeting portion. As a result, the rigidity tends to be decreased at the weld line. This tendency is evident particularly in the case where an angle less than 90 degrees is formed between the directions of the two flows of the molten resin material when the two flows enter the region around the through-hole.

However, even when employing the configuration in which the flange includes two straight portions each of which extends in the vicinity of the concave portion and in a direction in which a line tangent to the through-hole extends, and an angle less than 90 degrees is formed between the two straight portions, it is possible to obtain the same effects as those obtained according to the first aspect of the invention. That is, it is possible to appropriately suppress a decrease in the rigidity of the resin molded component even when employing the configuration in which the rigidity is likely to be decreased.

The rigidity tends to be decreased at the meeting portion at which the flows of the molten resin material meet each other during a molding process, that is, the portion at which the weld line is formed. This tendency is evident particularly in the case where the resin material containing glass fiber is used. However, even when employing the configuration in which the resin material forming the resin molded component contains glass fiber, it is possible to obtain the same effects as those obtained according to the first aspect of the invention. That is, it is possible to appropriately suppress a decrease in the rigidity of the resin molded component even when employing the configuration in which the rigidity is likely to be decreased.

Further, the invention can be applied to a resin intake manifold of an internal combustion engine.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein.

DETAILED DESCRIPTION OF THE EXEMPLARY EMBODIMENTS

Figure 1:
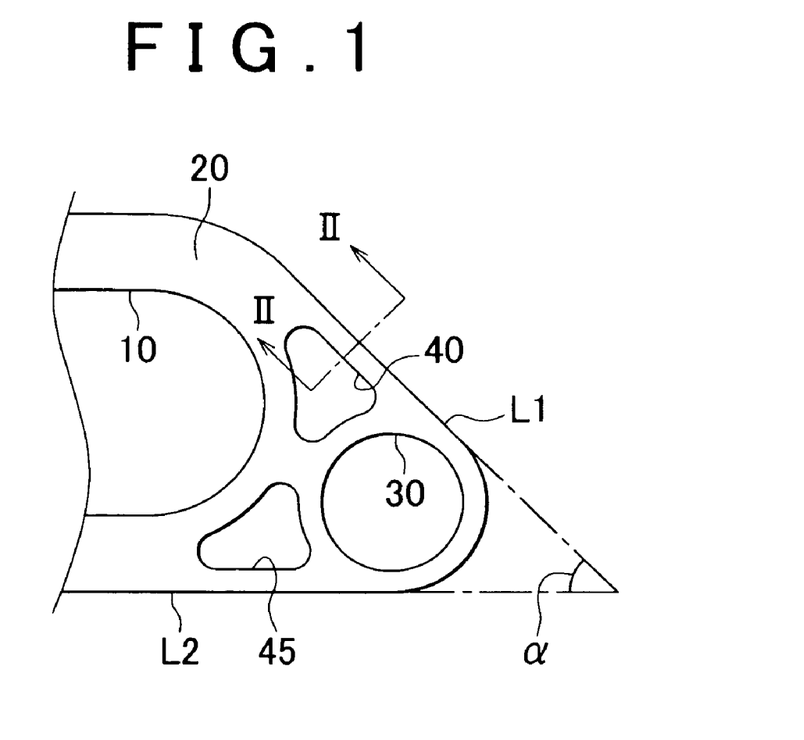
FIG. 1 is a partial front view showing a structure of a flange of a resin intake manifold according to an embodiment of the invention.

A resin intake manifold of an internal combustion engine according to an embodiment of the invention will be described with reference to FIG. 1 through FIG. 4. As shown in FIG. 1, this intake manifold includes an intake passage 10 and a flange 20. A through-hole 30 is formed in an end portion in a longitudinal direction of the flange 20. The intake manifold is fitted to a cylinder head (not shown) by inserting a bolt into the through-hole 30, and fastening the bolt.

Concave portions 40 and 45 are formed on a surface of the flange 20 that faces the cylinder head when the flange 20 is fitted to a cylinder head (i.e., a surface shown in FIG. 1). Each of the concave portions 40 and 45 is formed between the intake passage 10 and the through-hole 30 by reducing a thickness of a resin material. Since these concave portions 40 and 45 are formed by reducing the thickness of the resin material at portions that do not need to be thick, it is possible to reduce a weight of the intake manifold while maintaining rigidity of the intake manifold. The flange 20 includes straight portions L1 and L2. The straight portion L1 extends along the vicinity of the concave portion 40 and defines a line that is tangential to the through-hole 30. The straight portion L2 extends along the vicinity of the concave portion 45 and defines a second line that is also tangential to the through-hole 30. The angle α formed by the intersection of the lines defined by straight portions L1 and L2 is less than 90 degrees.

Figure 2:
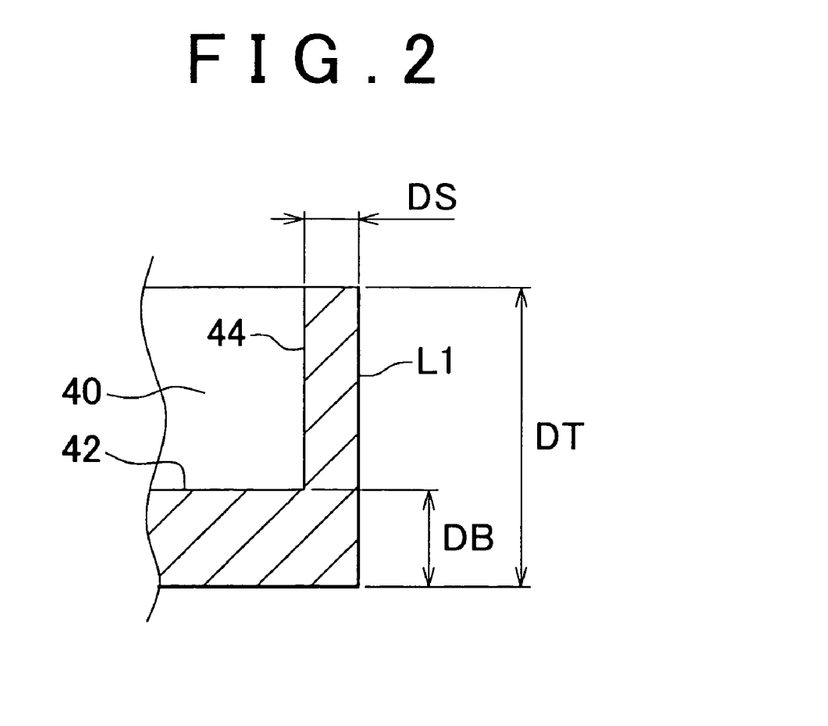
FIG. 2 is a sectional view taken along line II-II in FIG. 1.

FIG. 2 is a sectional view taken along line II-II in FIG. 1. As shown in FIG. 2, the thickness DB of the resin material in the bottom portion 42 of the concave portion 40 is greater than the thickness DS of the resin material in the wall 44 of the concave portion 40. It is preferable that the thickness DB of the resin material in the bottom portion 42 should be greater than the thickness DS of the resin material in the wall 44, and should be less than a half of a total thickness DT of the flange 20. Also, it is preferable that the thickness DB of the resin material in the bottom portion 42 should be approximately twice the thickness DS of the resin material in the wall 44.

In this embodiment, the thickness DB is preferably about 6 mm, the thickness DS is preferably about 2.5 mm, and the thickness DT is preferably about 20 mm. The resin material in the thinnest portion of the wall of the concave portion 40 has the thickness DS. Accordingly, the thickness DB of the resin material in the bottom portion 42 of the concave portion 40 is greater than the thickness of the resin material in the thinnest portion of the wall of the concave portion 40. The bottom portion 42 is formed as a flat portion that is parallel with the surface of the flange 20 that faces the cylinder head on which the flange 20 is fitted. The concave portion 45 and the concave portion 40 are preferably symmetrical to each other.

The intake manifold is formed by injecting a pressurized molten resin material into a die, and hardening the molten resin material. An appropriate resin material, such as polypropylene containing approximately 30 wt % of glass fiber, may be used. The glass fiber is mixed into the resin in order to reinforce the resin.

Figure 3:
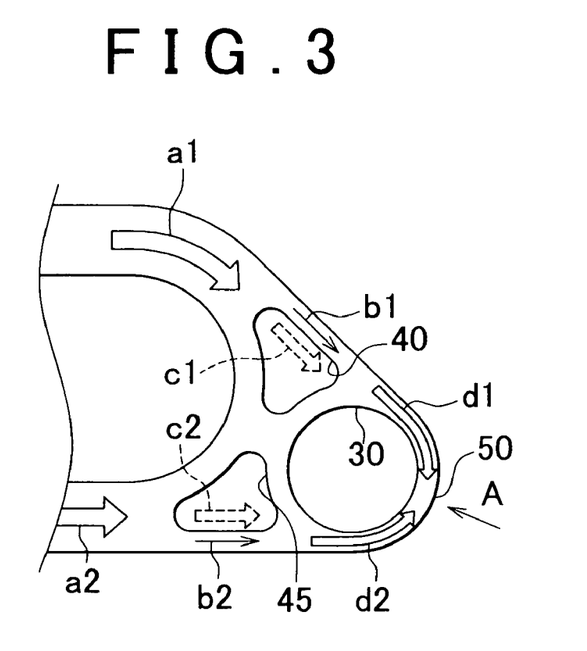
FIG. 3 is a partial frontal view showing flows of a molten resin material during a molding process of the intake manifold.

The arrows in FIG. 3 show the direction in which the molten resin material flows during the molding of the intake manifold. A thicker arrow indicates the flow of a greater amount of the molten resin material. As shown in FIG. 3, flows of the molten resin material indicated by arrows d1 and d2 pass along a periphery of the through-hole 30 until the flows meet. As such, the concave portions 40 and 45 are formed upstream of the location at which the flows of the molten resin material meet, where a weld line is formed in the vicinity of the through-hole 30.

The resin material in each of portions indicated by arrows a1 and a2 is relatively thick after molding is completed. That is, a sectional area of the flowing molten resin material is large in each of the portions indicated by the arrows a1 and a2. Therefore, the flow amount of the molten resin material is large in each of the portions indicated by the arrows a1 and a2. In contrast, the thickness (thickness DS) of the resin material in each of portions indicated by arrows b1 and b2 is thinner after the molding process is completed. That is, a sectional area of the flowing molten resin material is small in each of the portions indicated by the arrows b1 and b2. Therefore, the flow amount of the molten resin material is small in each of the portions indicated by the arrows b1 and b2. Nonetheless, the flows of the molten resin material indicated by the arrows b1 and b2 continue to flow into the walls of the concave portions 40 and 45 to form flows of the molten resin material indicated by arrows d1 and d2, respectively.

Arrows c1 and c2 indicate flows of the molten resin material in the bottom portions of the concave portions 40 and 45. The flows of the molten resin material in the bottom portions of the concave portions 40 and 45, as indicated by arrows c1 and c2, join the flows of the molten resin material indicated by the arrows b1 and b2, respectively, to form part of the flows of the molten resin material indicated by the arrows d1 and d2, respectively. The thickness DB of the resin material in the bottom portion of each of the concave portions 40 and 45 is greater than the thickness DS of the resin material in the thinnest portion of the wall of each of the concave portions 40 and 45 after molding is completed. Therefore, the flow amount of the molten resin material in each of the flows indicated by the arrows c1 and c2 is greater than the flow amount of the molten resin material in each of the flows indicated by the arrows b1 and b2.

Figure 4:
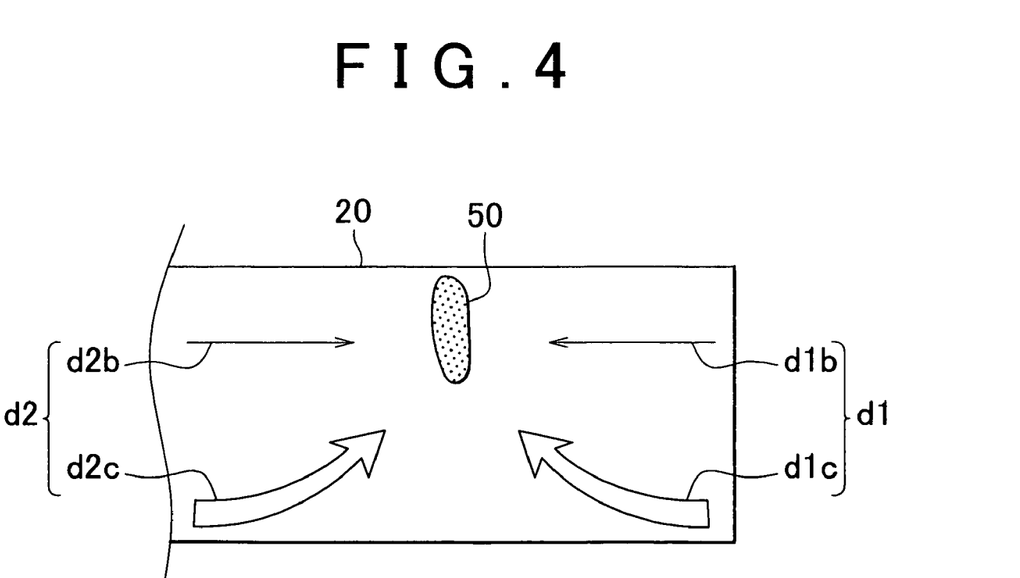
FIG. 4 is a partial lateral view showing flows of the molten resin material during the molding process of the intake manifold, and a weld line.

FIG. 4 shows the meeting portion at which the flows of the molten resin material meet each other when seen in a direction indicated by an arrow A in FIG. 3. The flow of the molten resin material indicated by the arrow d1 is formed by a flow of the molten resin material indicated by an arrow d1b and a flow of the molten resin material indicated by an arrow d1c. The flow of the molten resin material indicated by the arrow d1b is basically formed by the flow of the molten resin material indicated by the arrow b1. The flow of the molten resin material indicated by the arrow d1c is basically formed by the flow of the molten resin material indicated by the arrow c1. The flow of the molten resin material indicated by the arrow d2 is formed by a flow of the molten resin material indicated by an arrow d2b and a flow of the molten resin material indicated by an arrow d2c. The flow of the molten resin material indicated by the arrow d2b is basically formed by the flow of the molten resin material indicated by the arrow b2. The flow of the molten resin material indicated by the arrow d2c is basically formed by the flow of the molten resin material indicated by the arrow c2.

The flow amount of the molten resin material in each of the flows indicated by the arrows c1 and c2 is greater than the flow amount of the molten resin material in each of the flows indicated by the arrows b1 and b2. Therefore, the flow amount of the molten resin material in each of the flows indicated by the arrows d1c and d2c is greater than the flow amount of the molten resin material in each of the flows indicated by the arrows d1b and d2b. Further, the flows of the molten resin material indicated by the arrows d1c and d2c go from a lower surface side to an upper surface side of the flange 20. As a result, a weld line 50, which is formed where the flows indicated by the arrows d1 (d1b and d1c) and d2 (d2b and d2c) of the molten resin material meet each other, is unlikely to be formed near the lower surface of the flange 20. Also, size of the formed weld line 50 is reduced.

As described above in detail, with the resin intake manifold according to the embodiment, it is possible to obtain effects described below.

(1) The concave portions 40 and 45 are formed on the surface of the flange 20 that faces the cylinder head when the flange 20 is fitted to the cylinder head. The concave portions 40 and 45 are formed upstream of the location at which the flows of the molten resin material meet each other in the vicinity of the through-hole 30. The thickness of the resin material in the bottom portion of each of the concave portions 40 and 45 is greater than the thickness of the resin material in the thinnest portion of the wall of each of the concave portions 40 and 45. Therefore, the amount of the molten resin material flowing in the bottom portion of each of the concave portions 40 and 45 is greater than the amount of the molten resin material flowing in the wall of each of the concave portions 40 and 45 during a molding process. Thus, a greater amount of the molten resin material flows from the bottom portions of the concave portions 40 and 45 into the area around the through-hole 30, where the weld line 50 is formed than the amount of molten resin material flowing into the meeting portion from the wall of the concave portions 40 and 45. As a result, it is possible to suppress or eliminate the formation of the weld line 50. Therefore, the weight of the resin intake manifold can be minimized, and the rigidity of the resin intake manifold can be increased. Also, only the thickness of the resin material in the bottom portion of each of the concave portions 40 and 45 is increased without increasing the thickness of the resin material in the wall of each of the concave portions 40 and 45. Therefore, the rigidity of the resin intake manifold can be increased while minimizing an increase in the weight.

(2) In the case where the flows of the molten resin material meet around the through-hole formed in the end portion, in the longitudinal direction of the flange, the molten resin material flows for the longest possible distance before reaching the meeting portion. This configuration makes it difficult for the molten resin material to flow into the meeting portion. As a result, rigidity along the weld line tends be reduced. According to the embodiment of the invention, however, it is possible to suppress formation of the weld line 50 in the configuration in which the through-hole 30 is formed in the end portion. in the longitudinal direction of the flange 20. As a result, it is possible to appropriately suppress any reduction in the rigidity of the resin intake manifold in configurations in which there is an increased likelihood of reduced rigidity.

(3) In the case where a relatively small angle is formed between the directions of the two flows of the molten resin material when the flows enter the region around the through-hole, the direction of each of the flows is sharply changed in the region around the through-hole before the flows meet. This configuration makes it difficult for the molten resin material to flow into the meeting portion. This also tends to reduce rigidity along the weld line. This is particularly evident where an angle less than 90 degrees is formed between the directions of two flows of molten resin material when the flows enter the region around the through-hole. According to the embodiment of the invention, however, it is possible to suppress formation of the weld line 50 in the configuration in which the flange 20 includes the two straight portions L1 and L2 that extend in the vicinity of the concave portion 40 and the concave portion 45, respectively, and in the directions in which the lines tangent to the through-hole 30 extend; and an angle less than 90 degrees is formed between the two straight portions L1 and L2. As a result, it is possible to appropriately suppress any reduction in the rigidity of the resin intake manifold in configurations in which there is an increased likelihood of reduced rigidity.

(4) The rigidity tends to be decreased where the flows of the molten resin material meet each other during the molding process, that is, the portion at which the weld line is formed. The reduction in rigidity is particularly evident where the a resin containing glass fiber is used. According to the embodiment of the invention, however, it is possible to suppress formation of a weld line 50 in the configuration in which the resin material forming the resin intake manifold contains the glass fiber. As a result, it is possible to appropriately suppress any reduction in the rigidity of the resin intake manifold in configurations in which there is an increased likelihood of reduced rigidity.

(5) The thickness DB of the resin material in the bottom portion of each of the concave portions 40 and 45 may be, for example, 6 mm. The thickness DS of the resin material in the thinnest portion of the wall of each of the concave portions 40 and 45 may be, for example, 2.5 mm. The total thickness DT of the flange 20 may be, for example, 20 mm. Using the exemplary values, the thickness DB of the resin material in the bottom portion of each of the concave portions 40 and 45 is greater than the thickness DS of the resin material in the wall of each of the concave portions 40 and 45. The thickness DB of the resin material in the bottom portion of each of the concave portions 40 and 45 is less than a half of the total thickness DT of the flange 20. Also, the thickness DB of the resin material in the bottom portion of each of the concave portions 40 and 45 is approximately twice as large as the thickness DS of the resin material in the wall of each of the concave portions 40 and 45. As a result, the rigidity of the resin intake manifold can be increased without hindering reduction of the weight of the resin intake manifold.

The aforementioned embodiment can be appropriately modified. For example, the invention can be realized in forms described below. In the aforementioned embodiment, as the resin material forming the intake manifold, polypropylene containing approximately 30 wt % of glass fiber is used. However, the content of the glass fiber may be changed as necessary. Also, a resin material that does not contain glass fiber may be also used. As a material for reinforcing the resin material, for example, talc may be used. Also, other resin materials such as nylon may be used.

Figure 5:
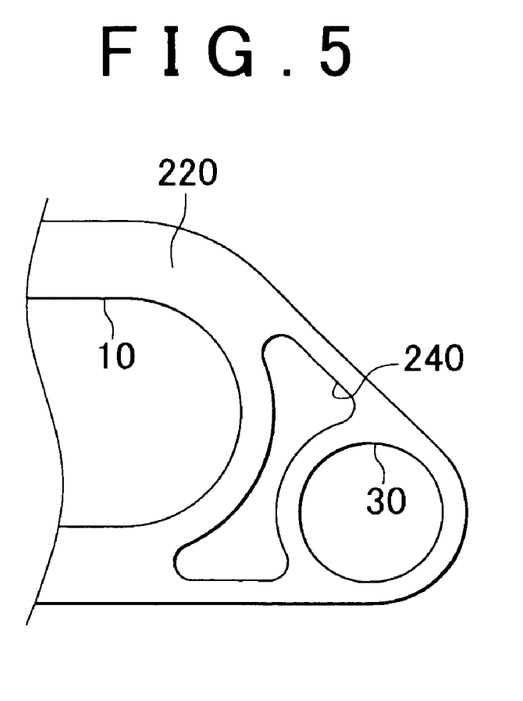
FIG. 5 is a partial frontal view showing a structure of a flange of a resin intake manifold according to a modified example of the embodiment.

In the aforementioned embodiment, the concave portions 40 and 45 are formed. However, as shown in FIG. 5, one concave portion 240 may be formed in the flange 220. The number of the concave portions and the shape of the concave portion may be changed according to design of each intake manifold.

Figure 6:
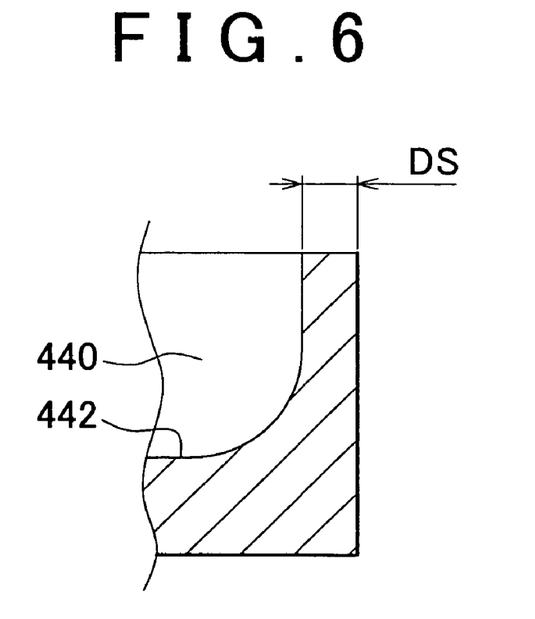
FIG. 6 is a partial sectional view showing a structure of a flange of a resin intake manifold according to another modified example of the invention.

In the aforementioned embodiment, the bottom portion of the concave portion is the flat portion. As shown in FIG. 6, however, a bottom portion 442 of a concave portion 440 does not necessarily need to be a flat portion, and does not necessarily need to be parallel with the surface of the flange that faces the cylinder head when the flange is fitted to the cylinder head. In other words, when the thickness of the resin material in the bottom portion of the concave portion is greater than the thickness of the resin material in the thinnest portion of the wall of the concave portion, a large amount of the molten resin material flows from the bottom portion of the concave portion into the meeting portion at which the flows of the molten resin material meet each other, as compared to the amount of the molten resin material flowing from the wall of the concave portion into the meeting portion.

Figure 7:
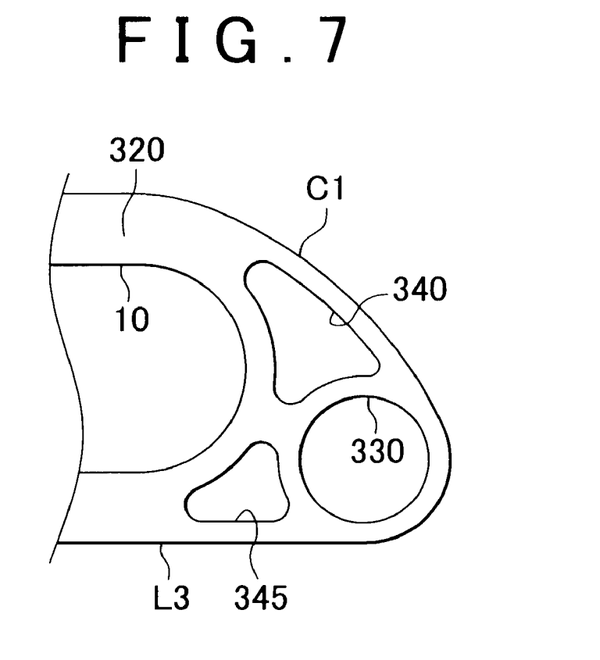
FIG. 7 is a partial frontal view showing a structure of a flange of a resin intake manifold according to another modified example of the embodiment.
Figure 8:
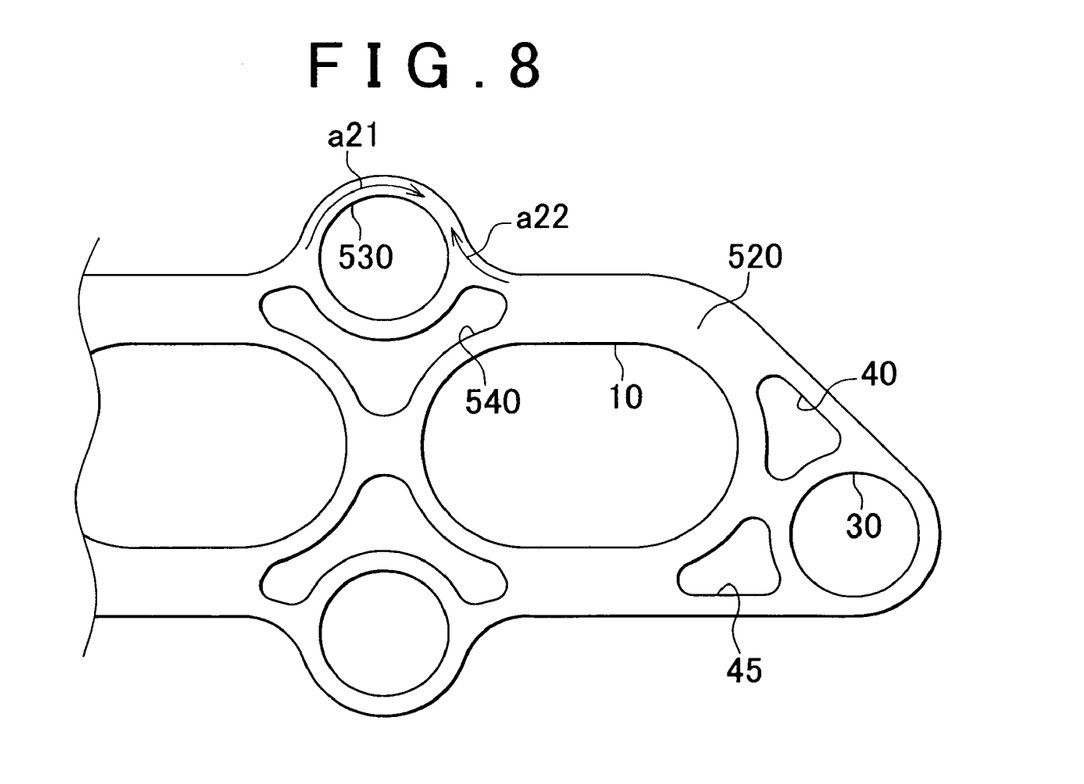
FIG. 8 is a partial frontal view showing a structure of a flange of a resin intake manifold according another modified example of the embodiment.

As shown in FIG. 7, in a flange 320, a curve portion C1 and a straight portion L3 may extend in the vicinity of a concave portion 340 and in the vicinity of a concave portion 345, respectively, in directions in which lines tangent to a through-hole 330 extend. Also, as shown in FIG. 8, a through-hole 530 may be formed in a portion other than an end portion in the longitudinal direction of a flange 520, and flows of the molten resin material may meet each other at a meeting portion in a region around the through-hole 530. That is, the weld line may be formed at the meeting portion in the region around the through-hole 530. In this case, a concave portion 540 is formed upstream of the meeting portion at which the flows of the molten resin material indicated by arrows a21 and a22 meet, and in the vicinity of the through-hole 530. When the resin intake manifold is molded, the molten resin material is generally injected into a die at several locations. Therefore, the flows of the molten resin material may meet at various meeting portions in the flange. However, if the flows of the molten resin material meet at a meeting portion in a region around the through-hole during the molding process and the weld line is formed at the meeting portion, and the concave portion is formed upstream of the meeting portion and in the vicinity of the through-hole, it is possible to obtain the same effects as those obtained in the aforementioned embodiment.

In the aforementioned embodiments, the invention is applied to the resin intake manifold of an internal combustion engine. However, the invention can be applied to a cylinder head cover, an air cleaner case, a water inlet, and the like. In other words, the invention can be applied to any resin-molded component that includes a flange having a through-hole.

What is claimed is:

1. A resin molded component for an internal combustion engine comprising:
 a single flange having a through-hole, wherein a concave portion is formed on a surface of the flange that faces a component used in the internal combustion engine on which the flange is fitted;
 the concave portion is formed upstream of an area in the periphery of the through-hole where, during a molding process of the resin molded component, a greater amount of molten resin material flows from a bottom portion of the concave portion into an area around the through-hole, than an amount of molten resin material that flows from a thickness of the resin material in a thinnest portion of a wall portion of the concave portion into a meeting portion of the flange to minimize formation of a weld line; and a thickness of the resin material in the bottom of the concave portion is greater than the thickness of the resin material in the thinnest portion of the wall of the concave portion.

2. The resin molded component according to claim 1, wherein the through-hole is formed in an end portion in a longitudinal direction of the flange.

3. The resin molded component according to claim 1, wherein the flange includes two straight portions each of which extends in a vicinity of the concave portion and in a direction in which a line tangent to the through-hole extends; and an angle less than 90 degrees is formed between the two straight portions.

4. The resin molded component according to claim 1, wherein the resin material forming the resin molded component contains glass fiber.

5. The resin molded component according to claim 1, wherein the resin molded component is an intake manifold.

6. The resin molded component according to claim 1, wherein the thickness of the bottom of the concave portion is about 6 mm and the thickness of the wall of the concave portion is about 2.5 mm.

7. The resin molded component according to claim 1, wherein the thickness of the bottom of the concave portion is about twice the thickness of the wall of the concave portion.

8. The resin molded component according to claim 1, wherein a total thickness of the flange is about 20 mm.

9. The resin molded component according to claim 1, wherein the thickness of the bottom of the concave portion is less than half of a total thickness of the flange.

10. The resin molded component according to claim 1, wherein the component is a cylinder head of the internal combustion engine.

11. A resin molded component for an internal combustion engine comprising:
a single flange having a through-hole and a concave portion formed on a surface of the flange that faces a component used in the internal combustion engine on which the flange is fitted, the flange includes two straight portions each of which extends in a vicinity of the concave portion and in a direction in which a line tangent to the though-hole extends, and an angle less than 90 degrees is formed between the two straight portions,
wherein the concave portion is formed upstream of an area in the periphery of the though-hole where, during a molding process of the resin molded component, a greater amount of molten resin material flows from a bottom portion of the concave portion into an area around the though-hole, than an amount of molten resin material that flows from a thickness of the resin material in a thinnest portion of a wall portion of the concave portion into a meeting portion of the flange to minimize formation of a weld line, and
a thickness of the resin material in the bottom of the concave portion is about twice the thickness of the wall of the concave portion.

12. The resin molded component according to claim 11, wherein the component is a cylinder head of the internal combustion engine.

13. A resin mold component for an internal combustion engine comprising:
a single flange having a though-hole and two concave portions formed on a surface of the flange that faces a component used in the internal combustion engine on which the flange is fitted, the flange includes two straight portions each of which extends in a vicinity of the concave portions and in a direction in which a line tangent to the though-hole extends, and an angle less than 90 degrees is formed between the two straight portions,
wherein the concave portions are formed upstream of an area in the periphery of the though-hole where, during a molding process of the resin molded component, a greater amount of molten resin material flows from bottom portions of the concave portions into an area around the though-hole, than an amount of molten resin material that flows from a thickness of the resin material in a thinnest portion of wall portions of the concave portions into a meeting portion of the flange to minimize formation of a weld line, and
a thickness of the resin material in the bottom portions of the concave portions is about twice the thickness of the walls of the concave portions.

14. The resin molded component according to claim 13, wherein the component is a cylinder head of the internal combustion engine.

* * * * *